Patented May 19, 1953

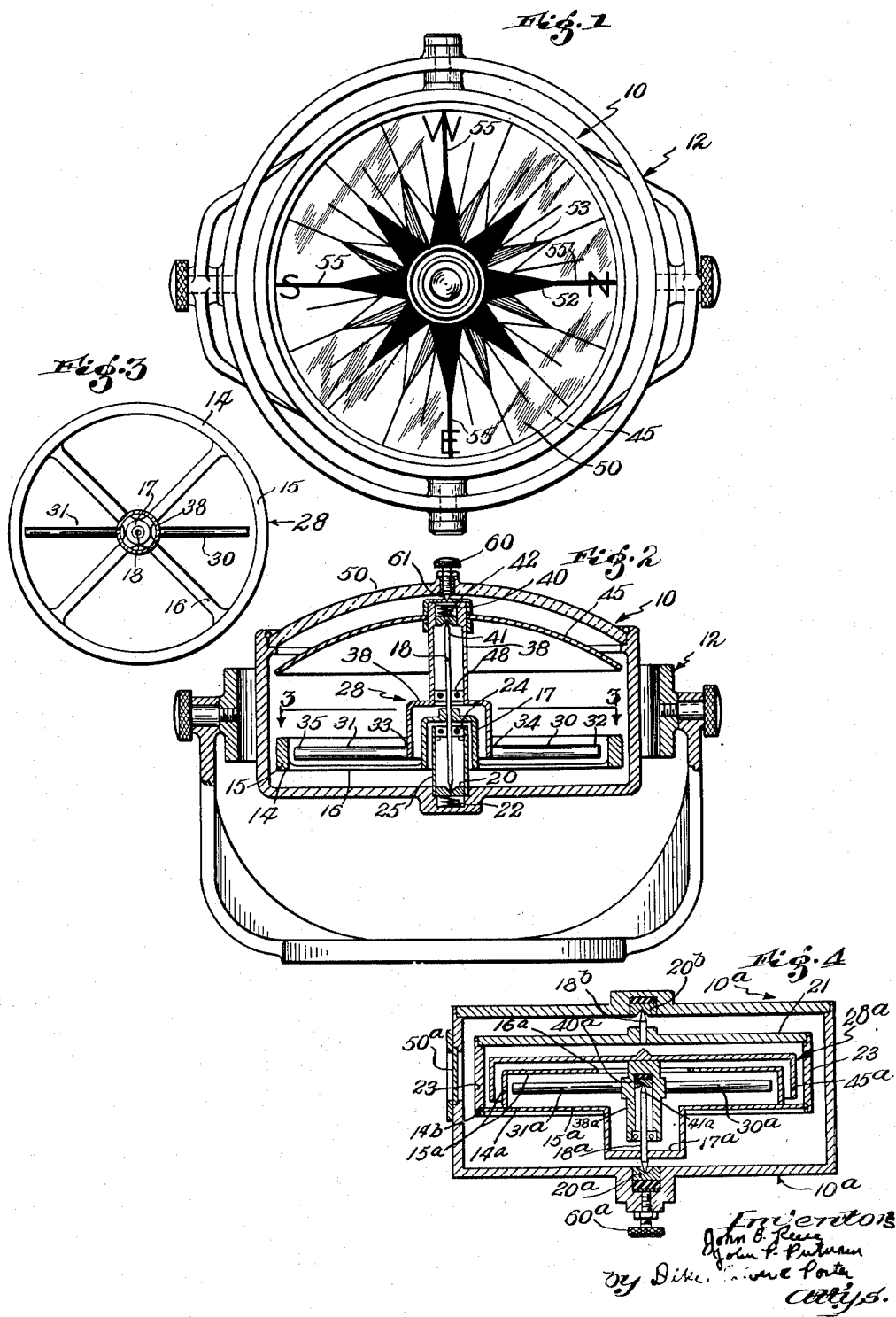

2,638,683

UNITED STATES PATENT OFFICE 2,638,683

MAGNETIC COMPASS

John B. Reece, Dedham, and John P. Putnam, Boston, Mass., assignors to The Reece Corporation, Boston, Mass., a corporation of Massachusetts Application October 27, 1948, Serial No. 56,684

4 Claims. (Cl. 33—222)

This invention relates to magnetic compasses and more particularly to a so-called "dead beat" magnetic compass in which deflections of the magnet element from its normal north seeking position are effectively damped.

A "dead beat" magnetic compass is a compass whose needle or north seeking magnet is not substantially deflected from its angular orientation by any disturbing physical forces, rotational or otherwise, which are imparted to the compass under normal conditions of use. When the normal conditions of use of a compass are such that its support is stationary as in a transit or other land surveying instrument, deflections caused by changes of position are not set up, and accurate readings can be obtained. However, many operating conditions of the compass demand that its support be in constant or frequent motion as when the compass is used on a moving vehicle, ship or aircraft which may not be still for any appreciable length of time, and is subject to course and heading changes, wave action, bumpy roads and bumpy air. Under these conditions disturbances are set up in the magnet element such that once imparted even for an instant the magnet element swings back and forth in a gradually diminishing pendulum-like or "hunting" motion for a considerable period of time resulting in errors which interfere with the effective use of the instrument. This invention provides a magnetic compass which is practically a "dead beat" compass and, therefore, increases the effectiveness of this type of instrument. Such a compass is still, of course, subject to magnetic errors such as are due to local distortion of the earth's magnetic field including variation and deviation which may be accounted for and compensated as in any other magnetic compass.

Throughout the history of the development of the magnetic compass, reputed to have been invented by the ancient Chinese, continuous effort has been made to produce a compass whose needle or card would retain its normal magnetic north seeking position under all changes of position to which the compass might be subjected.

Attempts have been made to increase the mass and therefore the inertia of the magnet element which somewhat reduces directional unsteadiness; and to improve the mechanical efficiency of the pivotal bearings around which the magnet element swings to reduce friction through which deflecting disturbances are imparted to the magnetic element.

Supporting nautical and air craft compasses in gimbals does not eliminate but only reduces the tendency of the magnet element to be deflected. The main purposes of mounting a compass in gimbals are to reduce the increased friction on the bearings when the parts are out of horizontal position and to eliminate other factors which tend to deflect the magnet element or compass card or needle when it is tipped out of horizontal.

Mounting the magnet element in a mass of liquid such as water or alcohol steadies the compass somewhat, but when the mass of liquid is increased relative to the magnet element in order to reduce the amount of friction transferred through the liquid to the magnet element, the latter, when deflected, is very sluggish in returning to its normal position. The usual nautical or aircraft liquid compasses are expensive to make because the compass bowl or support containing the elements and the liquid must be entirely air and liquid tight and at the same time provision must be made to allow for expansion and contraction of the liquid in the bowl. In spite of care and precision in manufacture of liquid compasses, air bubbles are apt eventually to enter the bowl causing distortion in the reading of the compass and throwing the compass system out of balance.

To be practical, conventional liquid compasses must be comparatively large and heavy which also adds to their expense and makes them difficult to adapt for use in aircraft.

Some damping effect has also been achieved by surrounding the magnet element of the compass with an electro-conductive damping element or ring in electro-magnetic proximity to the magnet element so that the tendency of the magnet element to be deflected from its normal north seeking position is damped or retarded by opposite rotational forces exerted on the magnet element by eddy currents which are set up in the damping element when the magnet element is disturbed and moves relative to it. However, results with such prior compasses have been entirely unsatisfactory for their use in ships, aircraft and other vehicles. In all of the known magnetic compasses the damping elements or rings are fixed in a rotational direction relative to the base or support of the compass and, therefore, they change position and direction with the compass. While working satisfactorily under ideal conditions as where the base or support remains fixed in space, such compasses do not work at all under most operating conditions, because when the compass changes position, the damping element drags the magnet element around with it away from its normal position and increases its deflection more than if such a damping element were not provided.

Consequently, in spite of hundreds of years of effort no one as far as is known has yet succeeded in providing a theoretically perfect or even operationally practical "dead beat" compass.

It is accordingly an object of this invention to provide a practical substantially "dead beat" and accurate compass. It is a further object of the invention to provide such a compass which is compact, light in weight and economical to manufacture.

Essentially the invention comprises a magnetic compass including the usual polar magnetic north seeking magnet element or needle or compass card and an eddy-current damping element which is mounted to rotate independently relative both to the compass support or bowl and also to the magnet element and having sufficient mass so that when the position in space or orientation of the compass is disturbed or subjected to change as described above, the damping element by inertia resists the tendency to turn with the support or in space relative to the surface of the earth. Such a compass constructed according to my invention is substantially "dead beat" and the magnet element thereof has almost no apparent deflection from its normal magnetic north seeking position in spite of the most violent and abnormal disturbing forces, particularly changes of direction which may be imparted to the compass support. This damping effect in the compass of the present invention is so marked compared to any other known magnetic compasses that a much more constantly accurate direction instrument is provided and which can be used for many new purposes and under many disturbing conditions under which conventional compasses would be useless due to their tendency to be deflected in spite of all precautions to the contrary. The compass of the invention is particularly useful in high speed aircraft where light weight and compactness are essential.

It is usual practice in selecting a suitable liquid magnetic compass to be used aboard a particular ship to obtain data on the period of roll of the ship and then to select a compass of a given size and whose magnet element itself has a given period of deflection or oscillation and which has the least tendency to be deflected due to the particular normal periodic roll of the ship. Consequently, different sizes of ships having different periods of roll would require compasses of different sizes and having different physical characteristics resulting in the necessity of manufacturing a large selection of sizes and types, and consequent high cost. The compass of the present invention is so nearly "dead beat" and effectively damped that any particular convenient size is "dead beat" on any size or type of ship or aircraft no matter what the period of roll may be. Furthermore, one form of the compass of the invention is accurate and "dead beat" as a dry compass when mounted in the usual gimbals and, therefore, the cost of manufacture of the usual liquid compass for marine and aircraft use is reduced. However, the eddy-current damping feature of the present compass may also be embodied in a liquid compass. It is adaptable for use in the usual manner as a directional instrument as, for instance, a directly read steering compass or shipboard standard compass and can be mounted in a binnacle and compensated or adjusted for errors such as deviation in the usual manner. This compass can be used in combination with a repeater device such as a master-slave remote indicator arrangement in which the compass is mounted in one position and read from a remote station by using electro-responsive or mechanical indicating means and it can be used, for instance, in automatic directional steering devices or mechanical pilots, aircraft drift indicators and, in fact, any conceivable embodiment requiring an accurate "dead beat" compass.

Since so many possibilities and uses for the compass of this invention have been suggested, the drawings, which show only two examples of the compass adapted for nautical and aircraft use, are merely exemplary and are not intended to limit the scope of the invention to the particular structure shown, especially since many variations in structural detail are contemplated.

In the drawings:

Fig. 1 is a plan view of the compass of the invention mounted in gimbals and adapted for shipboard use;

Fig. 2 is an elevational section taken in a plane through the central vertical axis of the compass of Fig. 1;

Fig. 3 is a plan view partly in section along the lines 3—3 of Fig. 2; and

Fig. 4 is a side elevational section in a plane through the main vertical axis of a modified form of the compass adapted for aircraft use and read edgewise or through the periphery thereof.

In the drawings, Figs. 1–3 of an example of a dry or non-liquid nautical type compass of the invention, reference numeral 10 indicates the support member or compass bowl adapted to support the various operative elements of the compass and within which said operative elements are mounted. Since the compass illustrated in Figs. 1 to 3 inclusive is adapted to nautical use, the bowl 10 is supported in gimbals generally indicated at 12 in such manner that the orientation or heading of the compass support 10 is fixed relative to the heading of the ship or other vehicle upon which it is mounted and yet at the same time the compass support 10 tends to maintain a horizontal position in the usual manner without regard to changes of inclination or trim in any direction of the supporting craft or vehicle. Within the compass support 10 a non-magnetic electro-conductive damping element 14 including a ring portion 15 is rotatably mounted to swing freely and independently of the compass support 10 by suitable supporting pivot means which, in the illustration, comprise spokes 16, a hollow hub 17, and substantially frictionless bearing elements including preferably an axial sharply pointed hardened metal spindle 18 through the center or axis of and fast to the hub 17 and resting in the hollowed out top of a jewel bearing 20 resiliently supported as by a spring 22 in the bottom of the support 10. The spindle 18 supporting the damping element 14 may preferably be maintained as illustrated in an upright position as by ball bearings or other frictionless ring bearings 24 supported by an upward tubular extension 25 from the bottom of the support 10 or the damping element 14 may be balanced on a jewel bearing support located above its center of gravity. The damping element 14 may also be mounted in any suitable substantially frictionless pivotal manner to float rotatably free at substantially any inclination as by supporting it pivotally in gimbals which are located within a compass support or bowl having, for instance, a semi-spherical or spherical interior. The ring portion 15 of the damping element 14 may be annular in shape and preferably formed as a complete circle and may be made of any suitable non-magnetic electro-conductive material such as aluminum or preferably copper. The entire structure of the magnet element 14 has a specific gravity such that the element 14 has sufficient mass within the limits of convenient dimensions so as to be substantially rotationally inert to disturbing forces which may be imparted to it through the support 10 under even the most extreme operational conditions. Therefore, having assumed any particular rotational inert position relative to the earth's surface a change in the position of the compass support 10 or other disturbance will not be imparted as a rotational force upon the damping element 14 for a purpose to be further described. The damping element 14 may have an infinite variety of shapes although the preferred form includes at least a circular ring portion 15. Fig. 2 shows an annular ring 15 having a rectangular cross section. Such a damping element may also have an L-shaped cross section or a U-shaped section, the latter somewhat as shown at 15a in Fig. 4. For certain operating conditions it may be desirable to provide a heavy cylindrically, conically, spherically or spheroidally shaped damping element having a comparatively large mass and having an internal circularly sectioned chamber (viewed parallel to its axis) having a regular or irregular cross section within which the magnet elements may rotate relative to the damping element. For certain purposes damping elements constructed as balanced structures containing portions of circles such as segments or sectors may be found satisfactory.

In the embodiment illustrated in Figs. 1-3, the polar magnetic north seeking magnet element indicated at 28 and pivotally mounted within the bowl 10 includes a pair of diametrically oppositely aligned bar magnets 30 and 31 having north seeking ends 32 and 33 and south seeking ends 34 and 35 respectively and each attached to a vertically disposed hollow central hub member 38 to the top of which is fast secured a sphero-circular compass bearing indicia member or compass card 45. The outer ends 32 and 35 of the magnets 30 and 31 (the ends which are away from their axis of rotation) lie at all times in a circumference of rotation within effective electro-magnetic proximity to the ring portion 15 of the damping element 14, with a small gap between the magnets 30 and 31 and the ring 15. A hollowed jewel bearing support 40 rotatably supported by and balanced on an upper pointed end 41 of the spindle 18 in turn resiliently supports the hub 38 and, consequently, the entire magnet element 28 through a spring 42. The magnet element assembly 28 including the magnets 30 and 31 may be further supported against wobbling relative to the spindle 18 as by frictionless ring bearings 48 within the hub 38. It may be desirable in some cases to provide some clearance between the bearings 24 and 48 respectively and the spindle 18 so that the said bearings are normally unused and with consequent reduction in operating friction when the parts remain normally level. Fig. 2 shows the parts without such clearance between the spindle 18 and the bearings 24 and 48. This provides relatively frictionless limits within which slight wobbling may occur between the parts with some resulting harmless angular variance or play between the axes of rotation of the magnet element 28, the damping element 15 and the normal vertical axis of the support 10 when the various elements are thrown relatively out of level. While the axes of rotation of the various parts may thus be allowed to vary relatively out of a normal coaxial relation, it will be seen that the pivots remain substantially coaxial.

The magnet element 28 may also comprise bar magnets disposed in lines parallel to a diameter through the pivotal axis of the element and lying in balanced groups on either side of the pivotal axis and having their extremities defined by a circumference of rotation about the pivot and in effective electro-magnetic proximity to the damping ring 15. Many embodiments of the magnet element structure 14 and modifications thereof are adaptable to the compass of the invention.

Fixedly mounted on the top of the compass bowl 10 is a sphero-circular transparent cover 50 serving principally to protect the operative parts of the instrument and to keep out dirt. Disposed about the surface of the compass bearing indicia member or card 45 are indicia graduated in cardinal and intercardinal compass points 52 and 53 or in more modern practice the compass bearing indicia member 45 may be graduated in equal increments of 360° beginning conveniently with zero at compass north and running clockwise in the usual manner. Reference index marks or lubber lines 55 indicating principal bearings relative to the heading of the ship or craft upon which the compass is mounted are inscribed or otherwise located on the surface of or in the cover 50, two of the diametrically opposed indices 55 being normally aligned with a fore and aft line of the ship to indicate its direction of travel or heading relative to the earth's surface. The compass bearing indicia 52 and 53 can be read through the transparent cover 50 with reference to the superposed index lines 55 to indicate the magnetic heading of the ship or craft (subject to variation and deviation) in the usual manner. Conveniently located in the center of the cover 50 a locking screw 60 may be provided which is normally retracted when the compass is in use but which may be screwed down into a detent 61 in the top of the magnet element assembly 28 to hold the operative parts rigid and prevent their breakage when the instrument is not in use or in transit as for instance in a portable embodiment of the instrument. The screw 60 may also be used to fulcrum or pivot a bearing indicating or sighting device on top of the instrument for taking magnetic compass bearings of terrestrial or celestial objects directly from the compass.

A modification of the compass particularly for aircraft use illustrated in Fig. 4 includes a support member or bowl 10a supporting a damping element 14a the structure of which includes an electro-conductive non-magnetic ring portion 15a formed in a U-shaped section which has a hole 16a in its top to clear the element 38a described below and a hub portion 17a which is fast on an axial spindle 18a resting on a jewel 20a and also supported substantially axially rigid of the support 10a by an upper coaxial spindle 18b and an upper jewel 20b in the top of the support or compass bowl 10a. The upper spindle 18b is fast to the damping element 14a through an upper hub 21 and a vertically disposed cylindrical transparent support 23 of any convenient material such as Lucite, glass or other transparent plastic secured to an outer peripheral portion 14b of the element 14a. A magnetic north seeking magnet element assembly generally indicated at 28a comprising north and south seeking magnets 30a and 31a, and a cylindrically shaped compass bearing indicia member or card 45a secured to a hub 38a is supported and substantially balanced upon the upper end 41a of the spindle 18a by a hollowed jewel bearing 40a. It will be seen that the ring portion 15a substantially encloses the magnets 30 and 31a in any relative rotational position between the parts providing a compact electro-conductive structure in effective electro-magnetic proximity to the magnets 30a and 31a. The structure of the damping element 14a has sufficient mass to be normally inert to rotation of the compass bowl 10a. A window 50a is provided in the side of the compass bowl 10a facing the pilot of the aircraft, and compass bearing indicia graduated in cardinal or intercardinal points or in degrees (not shown) are disposed about the outer cylindrical periphery of the member 45a and read in the usual manner through the window 50a and the transparent support 23 with reference to an index mark or lubber line (not shown) on the window 50a. The bottom and top jewel bearings 20a and 20b may be adjusted in spaced relation to provide for wear on the spindles 18a and 18b and the bearings by an adjusting screw 60a in the bottom of the compass bowl 10a which urges the bearing 20a upwardly when it is screwed in.

When disturbing forces tend to deflect and rotate the magnet elements 28 and 28a relative to the electro-conductive damping element 14 or 14a in the dry compasses of Figs. 1-4, eddy currents are generated in the rings 15 and 15a which exert an opposite rotational force between the damping element 14 or 14a and the magnet element 28 or 28a, respectively, thereby effectively damping further angular deflections of the magnet elements 28 or 28a; in other words, the magnet elements 28 and 28a have to do work against the eddy currents which are set up when any such relative movement takes place.

It will, therefore, be seen that the present invention provides a compass with the beneficial damping effects without the above mentioned disadvantages and defects. By mounting the electro-conductive damping elements to rotate independently of the other elements of the compass and providing such damping elements with sufficient mass so that they are substantially rotationally inert to any operative forces imparted to them through the bearings upon which they are mounted, the damping elements have no tendency to deflect the magnet element under such normal disturbing conditions. The damping elements of the invention may be allowed to settle in any position in which they happen to come to rest without affecting the operation of the compass. Any slight rotational forces which are imparted to such damping elements under operating conditions will cause them to rotate so slowly, if at all, that in one case there will be no eddy current effect and in the other no skin friction effect tending to deflect the magnet element away from its normal position. Even if the damping element should be caused to rotate very slowly the beneficial damping effect upon the magnet element substantially eliminates any deflections of the magnet element of a nature tending to render the compass less effective in use while deterrent and undesirable deflecting effects are not appreciably present. In actual practice a model constructed with an electro-conductive eddy current damping ring 15 according to the invention was subjected to disturbing forces which were so abnormal that the same forces applied to a known form of compass caused the magnet element of the latter to spin completely around continuously in one direction thus rendering the latter compass totally useless. Subjected to the same abnormal disturbing forces the compass of the invention remained for all practical operational purposes entirely "dead beat" so that perfectly accurate readings of the compass were obtained at all times during the test.

We claim:

1. In a magnetic compass and in combination, said compass having support means and a north seeking magnet element pivotally connected to said support means for rotation about a vertical axis, a damping element for said magnet element, said damping element comprising nonmagnetic electro-conductive material and being pivotally mounted to rotate substantially coaxially relative to said magnet element and substantially freely relative both to said magnet element and to said support means thereby substantially retaining its directional orientation when said compass is subjected to disturbing forces, said damping element being in such proximity to said magnet element that eddy currents are generated exerting an opposite rotational force between said damping element and said magnet element when said magnet element rotates relative to said damping element, said force effectively damping angular deflections of said magnet element.

2. In the combination as set forth in claim 1, indicating means registering the relative orientation between the support means and the magnet element.

3. In a magnetic compass and in combination, said compass having support means and a north seeking magnet element pivotally connected to said support means for rotation about a vertical axis, a damping element for said magnet element pivotally mounted to rotate substantially coaxially relative to said magnet element and substantially freely relative both to said magnet element and to said support means thereby substantially retaining its directional orientation when said compass is subjected to disturbing forces, a portion of said damping element being comprised of non-magnetic electro-conductive material, said portion being in such proximity to said magnet element that eddy currents are generated exerting an opposite rotational force between said damping element and said magnet element when said magnet element rotates relative to said damping element, said force effectively damping angular deflections of said magnet element.

4. In the combination as set forth in claim 3, a first pivotal bearing on said support means supporting said damping element and a second pivotal bearing on said damping element substantially coaxial with said first bearing and supporting said magnet element thereon, said magnet element being thereby pivotally connected to said support means through said bearings.

JOHN B. REECE.
JOHN P. PUTNAM.

References Cited in the file of this patent

UNITED STATES PATENTS

| Number | Name | Date |
|---|---|---|
| 2,003,179 | Faus | May 28, 1935 |
| 2,446,568 | Wolfe | Aug. 10, 1948 |

FOREIGN PATENTS

| Number | Country | Date |
|---|---|---|
| 353 | Great Britain | Feb. 5, 1866 |
| 25,506 | Great Britain | Nov. 7, 1913 |
| 424,285 | Great Britain | Feb. 19, 1935 |